(12) United States Patent
Heffield et al.

(10) Patent No.: US 12,344,403 B2
(45) Date of Patent: Jul. 1, 2025

(54) LEADING EDGE CLEANING DEVICE

(71) Applicant: JAARS, INC., Waxhaw, NC (US)

(72) Inventors: Terry Lee Heffield, Waxhaw, NC (US); Philip Lynn Janofski, Waxhaw, NC (US); Vasha Sedlacek, Norton Shores, MI (US)

(73) Assignee: JAARS, Inc., Waxhaw, NC (US)

( * ) Notice: Subject to any disclaimer, the term of this patent is extended or adjusted under 35 U.S.C. 154(b) by 314 days.

(21) Appl. No.: 18/046,048

(22) Filed: Oct. 12, 2022

(65) Prior Publication Data

US 2024/0124159 A1    Apr. 18, 2024

(51) Int. Cl.
*B64F 5/30* (2017.01)
*B08B 1/14* (2024.01)
*B08B 1/30* (2024.01)
*B08B 9/00* (2006.01)

(52) U.S. Cl.
CPC .............. *B64F 5/30* (2017.01); *B08B 1/14* (2024.01); *B08B 1/30* (2024.01); *B08B 9/00* (2013.01); *B08B 2209/00* (2013.01)

(58) Field of Classification Search
CPC ..... B64F 5/00; B08B 1/14; B08B 1/30; B08B 9/00; B08B 9/02; B08B 9/023; B08B 2209/00; B08B 2209/02
See application file for complete search history.

(56) References Cited

U.S. PATENT DOCUMENTS

| | | | |
|---|---|---|---|
| 2,348,252 A | 5/1944 | Griswold | |
| 3,237,697 A | 3/1966 | Ford | |
| 4,467,490 A * | 8/1984 | Adams | A47L 1/06 |
| | | | 15/245 |
| 4,575,030 A | 3/1986 | Gratzer et al. | |

(Continued)

FOREIGN PATENT DOCUMENTS

| | | | | |
|---|---|---|---|---|
| DE | 10332876 B4 * | 6/2008 | ............ | B08B 1/008 |
| ES | 2905968 T3 * | 4/2022 | ............ | B23P 6/007 |

OTHER PUBLICATIONS

Chakroun, Walid, Effect of Surface Roughness on the Aerodynamic Characteristics of a Symmetrical Airfoil, Wind Engineering, 2004, pp. 547-564, vol. 28, No. 5, Kuwait.

(Continued)

*Primary Examiner* — C. A. Rivera

(57) ABSTRACT

The instant invention is directed to a leading edge cleaning device which comprises a concave internal surface which is complementary to an airfoil shaped body profile over a selected percentage of the airfoil chord measured from the leading edge. The complimentary shape of the leading edge cleaning device serves to maintain contact with the airfoil leading edge during the cleaning process that removes surface contamination that causes roughness that can result in undesired detachment of the air flowing around the airfoil during operation. Removing airfoil surface roughness and restoring a smooth airfoil surface by cleaning spanwise along the leading edge over a selected percentage of the (Continued)

airfoil chord measured from the leading edge with the instant invention provides for increased overall performance, reduced drag and increased effective lift through restoring laminar flow around the leading edge of the airfoil as compared to an airfoil with surface roughness.

20 Claims, 10 Drawing Sheets

(56) References Cited

U.S. PATENT DOCUMENTS

| | | | |
|---|---|---|---|
| 5,979,001 | A | 11/1999 | Marrero |
| 6,840,741 | B1 | 1/2005 | Wake |
| 7,854,593 | B2 | 12/2010 | Owen |
| 8,033,510 | B2 | 10/2011 | Shmilovich |
| 8,192,163 | B2 | 6/2012 | Siebers |
| 8,851,211 | B2 | 10/2014 | Schlee et al. |
| 9,302,787 | B2 | 4/2016 | Hafenrichter et al. |
| 9,598,167 | B2 | 3/2017 | Grip et al. |
| 10,640,236 | B2 | 5/2020 | Storm. et al. |
| 11,300,477 | B2 | 4/2022 | Hafenrichter et al. |
| 2018/0105291 | A1* | 4/2018 | Storm .................. B08B 7/0028 |
| 2020/0180787 | A1 | 6/2020 | Hafenrichter et al. |
| 2021/0129983 | A1 | 5/2021 | Ratti |
| 2021/0237862 | A1 | 8/2021 | Yasuda et al. |

OTHER PUBLICATIONS

Khalfallah, Mohammed G., Effect of dust on the performance of wind turbines, Desalination, 2007, pp. 209-220, vol. 209, Kuwait.

* cited by examiner

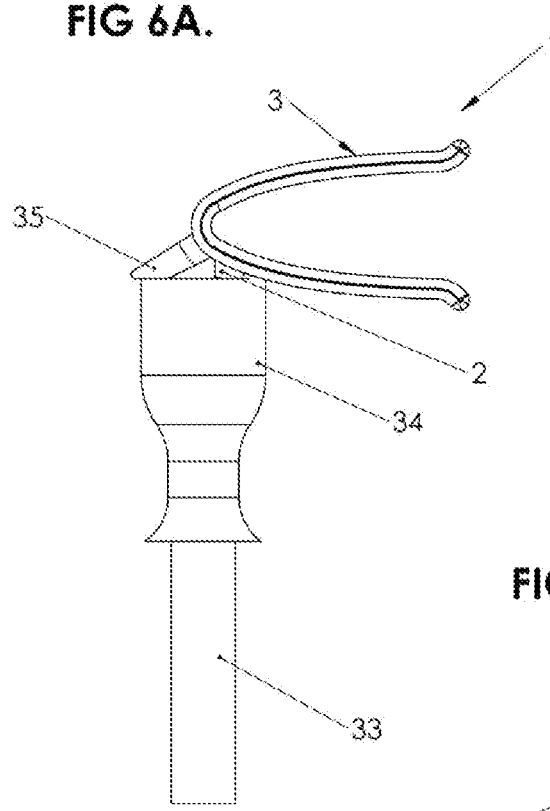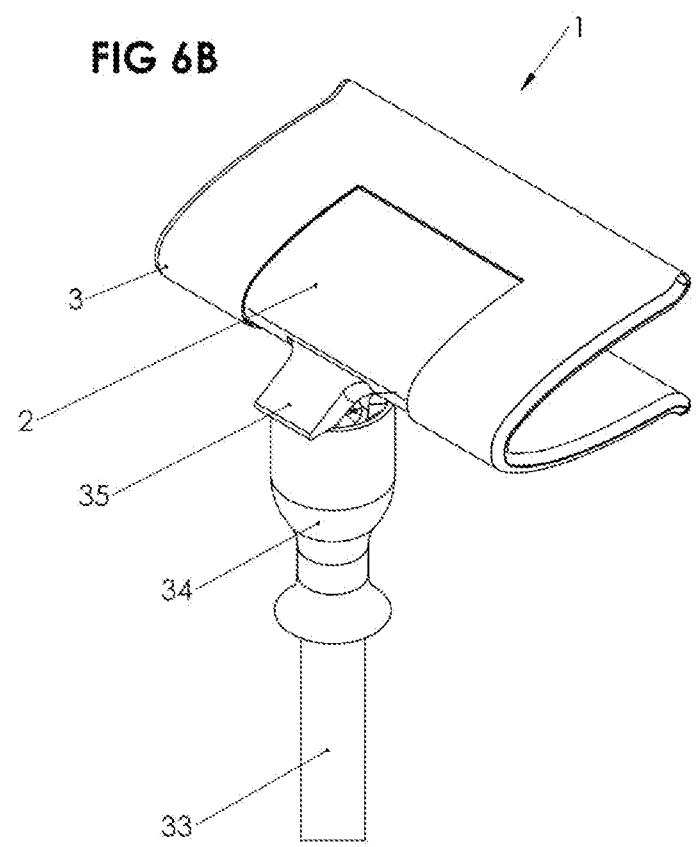

FIG. 9

| Aircraft | Airfoil | Visual of Airfoil |
|---|---|---|
| Airtractor | NACA 4415 | NACA4415<br>14.9% thick at 30% chord, 3.7% camber<br>Cl,max =1.88 L/D,max = 146 Cd,min = 0.009 |
| Beechcraft Bonanza | NACA 23016.5 | CB2513<br>13.0% thick at 30% chord, 2.5% camber<br>Cl,max =1.47 L/D,max = 128 Cd,min = 0.007 |
| Boeing 707 | BAC310 | BOEING 707 .19 SPAN<br>12.2% thick at 32% chord, 0.7% camber<br>Cl,max =1.40 L/D,max = 107 Cd,min = 0.006 |
| Cessna 172 | NACA 2412 | NACA2412<br>11.9% thick at 30% chord, 1.7% camber<br>Cl,max =1.42 L/D,max = 123 Cd,min = 0.008 |
| Grob 102 | Eppler 603 (18.9%) | EPPLER 603<br>19.0% thick at 40% chord, 3.7% camber<br>Cl,max =1.81 L/D,max = 230 Cd,min = 0.004 |
| Robinson R44 | NACA 63-015 | NACA63-015<br>15.0% thick at 34% chord, 0.0% camber<br>Cl,max =1.21 L/D,max = 97 Cd,min = 0.004 |
| Sikorsky S-67 | NACA 4415 | NACA4415<br>14.9% thick at 30% chord, 3.7% camber<br>Cl,max =1.88 L/D,max = 146 Cd,min = 0.009 |

LEADING EDGE CLEANING DEVICE

BRIEF STATEMENT OF THE INVENTION

The present invention relates to an airfoil leading edge cleaning device, also known as a leading edge debugger (LED), and a method for cleaning the leading edge of airfoil shaped bodies in a spanwise direction. The LED comprises a concave internal surface which is complementary to a chosen airfoil profile over a selected percentage of the airfoil chord as measured from the leading edge. The airfoil specific shape of the LED's complementary concave internal surface helps maintain contact with the airfoil surface during the cleaning process for effectively removing surface roughness caused by surface contamination including particulate matter, debris, dirt, dust, pollen, or insects, and restoring airfoil smoothness. The cleaning device will also disengage from the leading edge when the LED experiences inadvertent downward force assisting to avoid airfoil damage.

BACKGROUND OF THE INVENTION

Airfoils in various forms are widely applied in passenger aircrafts, such as airplanes and helicopters, unmanned aircrafts, such as drones, and windmill turbines. (Examples of airfoils are described in U.S. Pat. Nos. 2,348,252; 3,237,697; 4,575,030; 6,840,741 B1; US; U.S. Pat. No. 7,854,593 B2; U.S. Pat. No. 9,598,167 B2; U.S. Patent Application Publication 2021/0237862; U.S. Patent Application Publication 2021/0129983).

As oncoming air flows against an airfoil shaped body, the fluid attaches to the airfoil surface, resulting in smooth laminar flow over the leading edge. Laminar flow necessitates a smooth surface, and is preferable for reducing drag of streamlined bodies, such as airfoils, because skin friction drag, a component of profile drag, is the dominant source of air resistance.

During operation unwanted surface contamination accumulates on the smooth surface of the airfoil leading edge disrupting the air flow resulting in undesired flow separation. Separation of the air flow from the airfoil surface increases pressure drag and can significantly reduce lift, even to the point of aerodynamic stall. Accumulation of surface contamination on a blade surface also serves to decrease the angle of attack at maximum lift, resulting in a larger probability of stalling the blade.

A non-abrasive, non-scraping, leading edge cleaning device which is specific to a selected airfoil shaped body is desirable for removing surface contamination from the airfoil surface, because abrasive, airfoil non-specific cleaning devices (such as the device of U.S. Pat. No. 4,467,490) can increase the likelihood of damage to airfoil blade surface coatings through introduction of permanent surface roughness from unintended removal of airfoil surface material.

DESCRIPTION OF RELATED ART

While automated cleaning devices for the leading edges of airfoil shaped bodies are known in the art, they require complex and costly systems to carry out the desired cleaning process through control systems, power supplies, vacuums for adherence, systems of wires to move the device along the leading edge and specifically designed computer programs (U.S. Pat. No. 8,192,163 B2; U.S. Pat. No. 9,302,787 B2; U.S. patent application Publication 2020/0180787 A1; U.S. Pat. No. 10,640,236 B2; U.S. Pat. Nos. 5,979,001 A; 8,192, 163 B2, system of wires, column 3, "self-cleaning mechanism" column 9; U.S. Pat. No. 9,302,787 B2 vacuum adherence, abstract and title). Leading edge devices which are flexible with spaced apart cleaning surfaces allow for complementarity to an airfoil leading edge but result in discontinuous contact with the airfoil surface, as well as require complex machinery to carry out the desired cleaning process (U.S. Pat. No. 10,640,236 B2; U.S. Pat. No. 9,302, 787 B2).

Leading edge cleaning devices that are administered by hand are also known but are limited by the height of the airfoil shaped body above the ground and often require the use of a ladder, thereby introducing a potential fall risk.

A manual prior art curved flex plastic cleaning device, owned by CleanWing, LLC., only covers a small percentage of the chord length along the leading edge. Spanwise cleaning along the leading edge is unable to reach bugs or debris accumulated on the airfoil surface beyond the range of the curvature of the prior art device because the device requires application of continuous manual pressure in the chordwise direction to conform the device to the curvature of leading edge airfoil profile.

Chakroun et al, 2004, Wing Engineering, volume 28(5), pages 547-564, instruct the person of skill in the art that roughness covering 50% of the total airfoil surface located at the leading edge shows maximum drag (Chakroun et al, page 552, paragraph 2) for a symmetrical airfoil. Khalfallah et al, Desalination, 2007, volume 209, pages 209-220, teach the person of skill in the art that dust accumulated over an airfoil blade area 20% of chord showed the greatest power variability and loss in power output due to standard roughness increasing, as well as teach that blades which have big leading edge areas collect more dust that in turn effects power (Khalfallah et al, FIG. 9, page 216, column 1, column 2 and page 214, column 1, bottom of paragraph 2).

The prior art does not disclose, teach nor reasonably suggest the instant invention that is easily transportable, readily storable, maintains the shape of the desired airfoil profile, does not require the use of a ladder to reach the airfoil surface, comprises a concave internal surface which is complementary to a chosen airfoil profile over a selected percentage of the airfoil chord as measured from the leading edge to insure contact during cleaning, able to simultaneously clean upper and lower camber surfaces during spanwise cleaning, restores a smooth leading edge surface that results in improved fuel efficiency, lift and weight carrying capacity without causing airfoil blade damage from abrasive cleaning, as well as assists the user with a visual indicator when inadvertent downward force is applied during the cleaning process.

SUMMARY OF THE INVENTION

The instant invention addresses the need for a lightweight, inexpensive, readily transportable, leading edge cleaning device which has broad application, few parts, is simple to use as it does not require automation, is readily adaptable to any known or future airfoil profile, and contains a built-in intermediate member that lifts the device from the airfoil surface when inadvertent downward force is applied to the airfoil shaped body. In the case of rotor blades, inadvertent downward force has the potential to cause blades to deform or fracture, which may generate imbalance in the rotor and shearing of the droop stop bolt. With repetition, this accumulation of small damages can potentially lead to a catastrophic event. To combat this, the instant invention comprises an intermediate member capable of multidirectional rotation which serves to help avoid blade damage, as well as provides a visual indicator that the cleaning device should be realigned with the airfoil surface to continue the cleaning process.

The structural element of the LED complements the profile of an airfoil shaped body, rotor blade, or wing and comprises a concave internal surface complementary to a selected percentage of 20% to 50% of the total chord length of an airfoil extending chordwise from the leading edge to restore laminar flow. The LED device of the instant invention maintains the shape of the desired airfoil shaped body profile even at an extended distance above the ground, removes surface contamination responsible for airfoil roughness across the airfoil leading edge to a selected percentage of 20% to 50% of the total chord length of an airfoil as measured from the leading edge resulting in improved laminar flow over the airfoil shaped body profile surface, and eliminates potential fall risk as it works without the need for a ladder.

The instant invention LED forms a continuous contacting surface for cleaning an airfoil profile compared with prior art devices which clean with spaced apart cleaning surfaces, does not require complex and costly systems to carry out the desired cleaning process and is able to simultaneously clean both the upper and lower camber of either a symmetric or asymmetric airfoil. The LED can be used to apply an aviation accepted smoothing substance such as rotor blade wax after cleaning.

Once delivered to the airfoil leading edge, the LED cleans spanwise along the airfoil shaped body, effectively removing surface contamination. Spanwise cleaning can be accomplished in a single direction or in a back-and-forth direction along the leading edge.

The leading edge cleaning device of the instant invention effectively restores a smooth surface to the airfoil leading edge resulting in improved fuel efficiency, lift and weight carrying capacity without causing airfoil blade damage due to accidental removal of essential material from the surface of the airfoil from abrasive cleaning.

These and other features, aspects and advantages of the present invention will become better understood with reference to the following description and appended claims. The accompanying drawings, which are incorporated herein and constitute a part of this specification, illustrate embodiments of the invention and, together with the description, serve to explain how to make and use, as well as the principles of the invention.

DESCRIPTION

The term 'airfoil profile,' as used herein, includes within its meaning, the cross-sectional shape of an object whose motion through a fluid is capable of generating significant lift, such as a wing, blade of a propeller, rotor, or turbine.

The phrase 'airfoil chord', also referred to as 'chord line', is represented by a straight line drawn from the leading to trailing edge of an airfoil.

The term 'asymmetrical airfoil', also referred to in the art as 'cambered airfoil', refers to an airfoil profile having an upper camber and lower camber which are asymmetric about the chord line. The maximum camber of an asymmetrical airfoil is nonzero.

The term 'symmetrical airfoil' also referred to in the art as 'uncambered airfoil' refers to an airfoil profile having an upper camber and lower camber which are symmetric about the chord line. The mean camber line of a symmetric airfoil coincides with the chord line and the symmetric airfoil will have a maximum camber of zero.

The phrase 'angle of attack' represents the angle between an airfoil chord and a free stream velocity of the airflow.

The phrase 'chord length' describes the distance between the trailing edge and the point where the chord intersects the leading edge.

The term 'camber' refers to the convexity of the curve of an airfoil from the leading edge to the trailing edge.

The phrase 'lower camber' refers to the curvature of the lower surface of the airfoil.

The phrase 'upper camber' refers to the curvature of the upper surface of the airfoil.

The phrase 'mean camber line' represents a locus of the mid-points between the upper and lower surfaces when measured perpendicular to the camber line.

The phrase 'max camber' refers to the maximum distance between the mean camber line and the chord line of an airfoil.

The phrase 'flow separation' should be understood to include within its meaning the detachment of fluid flow from the surface of a body.

The phrase 'turbulent flow' describes fluid flow in which the fluid undergoes irregular fluctuations and mixing.

The phrase 'laminar flow' includes within its meaning smooth uninterrupted fluid flow. Flow in which the fluid travels smoothly or in regular paths, in contrast to turbulent flow. In laminar flow, the velocity, pressure, and other flow properties at each point in the fluid remain constant.

The term 'lift' describes the force that is produced by the dynamic effect of the air acting on the airfoil and acts perpendicular to the flight path through the center of lift and perpendicular to the lateral axis. In level flight, lift opposes the downward force of weight.

The phrase 'leading edge' is understood to represent the foremost edge of an airfoil surface which first meets the oncoming air.

The phrase 'trailing edge' represents the rear edge of an airfoil where the airflow separated by the leading edge rejoins.

The phrase 'maximum airfoil thickness' represents the maximum distance between the upper and lower surfaces of the airfoil.

The phrase 'free stream velocity' includes within its meaning the speed at which the air infinitely far from a body is moving when the object is kept as referential.

The phrase 'airfoil shaped body' is intended to include within its meaning wings and blades used in helicopter rotor blades, aircraft wings, windmill turbine blades, or drone blades.

The term 'attach,' including other forms of the word, such as attached, attachment, attaching, is intended to include within its' meaning reversibly combined, securely joined.

As used herein, the phrase 'of 20% to 50% of the airfoil chord measured from the leading edge' defines a surface over which contamination, such as dirt and insect parts, has accumulated on the airfoil shaped body. In a preferred embodiment, a selected percentage of 20% to 50%, or any percentage within this range, of the airfoil chord as measured from the leading edge, see FIGS. 3A-3B label 25 and FIG. 4C label 25, serves to define the percentage of the total chord length of the airfoil profile to which the structural element label 2 and the cleaning element label 3 are complementary.

The phrase 'concave internal surface' describes a complementary surface to an airfoil shaped body with an airfoil profile that comprises symmetrical or asymmetrical upper and lower cambers to produce the airfoil profile. The concave internal surface of the structural element label 22 seen in FIG. 3A and the leading edge cleaning surface of the cleaning element label 28 seen in FIG. 4A-4C are complementary to the selected airfoil profile over a selected percentage of the airfoil chord as measured from the leading edge.

The phrase 'complementary to an airfoil profile,' as used here in, refers to complementarity as the match of the concave internal surface to the convex surface of the airfoil.

The phrase 'upper external surface' refers to the outer upper surface of the structural element of the instant invention.

The phrase 'lower external surface' refers to the lower outer surface of the structural element of the instant invention.

The phrase "thickness of airfoil at a selected percentage of the chord" refers to the distance between the upper and lower cambers of the airfoil, perpendicular to the chord line, at the selected percentage of the total chord length.

The phrase "thickness of structural element at a selected percentage of the chord" refers to the distance between the upper and lower internal surfaces of the structural element, perpendicular to the chord line, at the selected percentage of the total chord length.

The phrase "thickness of cleaning element at a selected percentage of the chord" refers to the distance between the upper and lower internal surfaces of the cleaning element, perpendicular to the chord line, at the selected percentage of the total chord length.

The phrase "droop stop" or "droop stops" is intended to include within its meaning a device that limits downward vertical motion of helicopter rotor blades upon rotor shutdown. The stops are for limiting downward deflections.

BRIEF DESCRIPTION OF THE DRAWINGS

FIG. 6A is a side view of the leading edge cleaning device comprising the structural element of FIG. 5A and further comprising a movable sleeve and an extension element.

FIG. 6B is a perspective view of the leading edge cleaning device of FIG. 6A.

FIG. 9 is a table showing an overview of various airfoil profiles used for a variety of known aircrafts to which the instant invention can be made for cleaning the leading edge. Abbreviation meanings are provided in the detailed description of the drawings.

DETAILED DESCRIPTION OF THE DRAWINGS

Figure 1A:
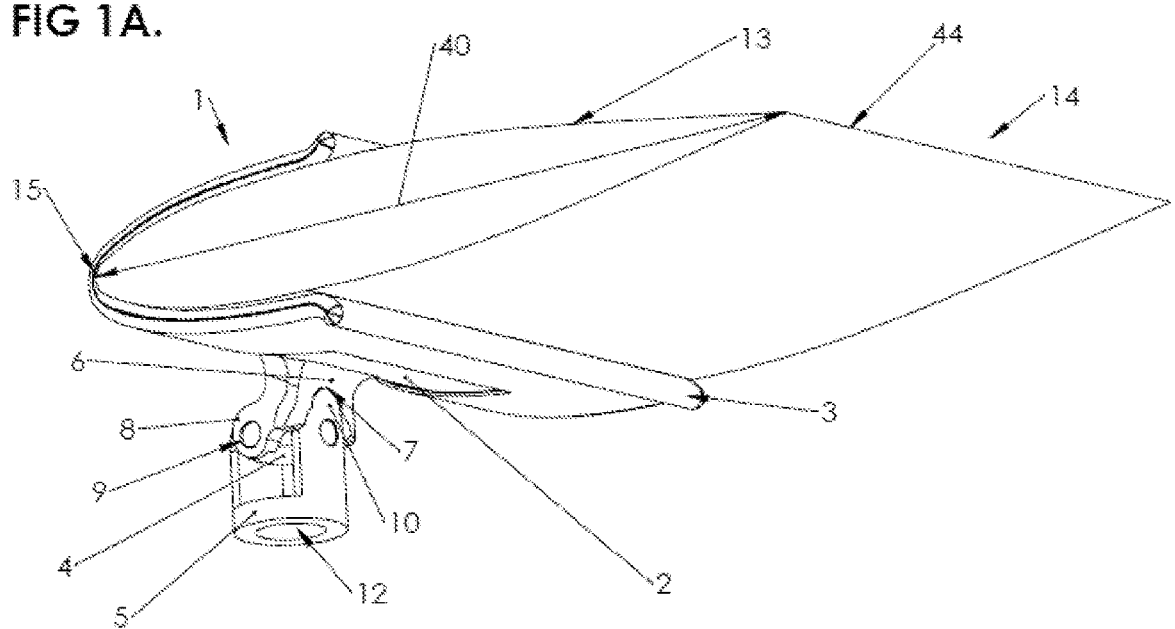
FIG. 1A is a perspective view of the leading-edge cleaning device comprising a structural element that forms a complementary surface to an airfoil shaped body, a detachable non-abrasive absorbent cleaning element, an intermediate member, and a delivery element.

Part labels used in the Drawings: 1. Assembled cleaning device; 2. Structural element; 3. Detachable non-abrasive absorbent cleaning element; 4. Intermediate member; 5. Delivery element; 6. First domain; 7. Female contact point; 8. Second domain; 9. Structural element attachment point for intermediate member; 10. Male contact point; 11. Mechanical stop; 12. Connection region; 13. Airfoil profile; 14. Airfoil shaped body; 15. Leading edge; 16. Lower External surface; 17. Proximal end; 18. Distal end; 19. Upper external surface; 20. Upturned lip; 21. Upper internal surface; 22. Concave Internal surface; 23. Lower internal surface; 24. Downturned lip; 25. X % of Chord length; 26. Thickness of structural element at chosen percentage of airfoil chord; 27. Outer surface; 28. Leading edge cleaning surface; 29. Access window; 30. Upper lip contour of cleaning element; 31. Lower lip contour of cleaning element; 32. Interface surface with structural element; 33. Extension element; 34. Moveable sleeve; 35. Stabilizing element; 36. Flat contacting surface; 37. Attachment guide of structural element for intermediate member; 38. Thickness of cleaning element at chosen percentage of airfoil chord; 39. Thickness of airfoil at chosen percentage of airfoil chord; 40. Chord; 41. Mean camber line; 42. Upper camber; 43. Lower camber; 44. Trailing edge;

45. Pivotal shafts; 46. Attachment guide on delivery element; 47. Attachment point on delivery element for intermediate member; 48. Non-abrasive cleaning liquid or fluid or non-abrasive aviation cleaning solution; also referred to as cleaning fluid; 49. Instruction manual; 50. Upper internal surface of cleaning element; 51. Lower internal surface of cleaning element; 52. Internal thread; 53. External thread; 54. Spring loaded pin; 55. Pin connection point; 56A. Threaded delivery element assembly; 56B. Spring loaded pin delivery element assembly; 57. Downward force.

With reference now to the drawings, FIGS. 1A through 8D show a new airfoil leading edge cleaning device designated by reference numeral 1, and elements and member thereof. The LED 1 serves to remove airfoil profile 13 surface roughness caused by contamination comprising particulate matter, debris, insect parts, bugs, dirt, pollen, dust, or grass, from the leading edges 15 of airfoil shaped bodies 14 in particular for airfoil profiles of helicopter rotor blades, aircraft wings, windmill turbine blades, or drone blades. The assembled cleaning device 1 forms a cohesive, functional cleaning device for an airfoil shaped body 14, the device comprising a structural element 2, a detachable, non-abrasive, absorbent cleaning element, also known herein as the cleaning element 3, an intermediate member 4, and a delivery element 5.

Figure 10:
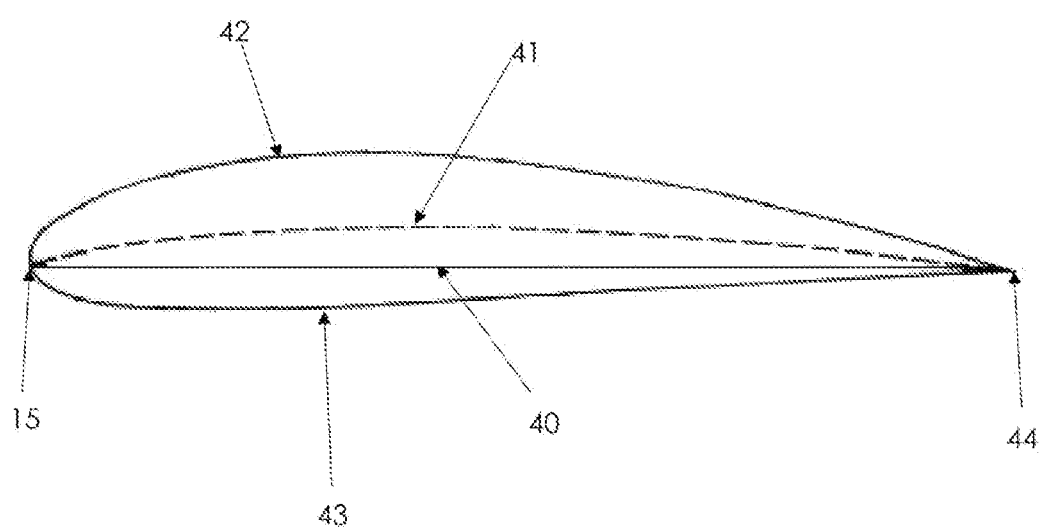
FIG. 10 is a diagram of a generic airfoil profile identifying the essential components of any given airfoil.

Examples of known airfoil profiles to which the instant invention can be made by one of skill in the art are shown in FIG. 9. FIG. 10 provides a generic diagram of an airfoil profile identifying the essential components of any given airfoil, to include the leading edge 15, chord line 40, mean camber line 41, upper 42 and lower 43 cambers and trailing edge 44.

Figure 1B:
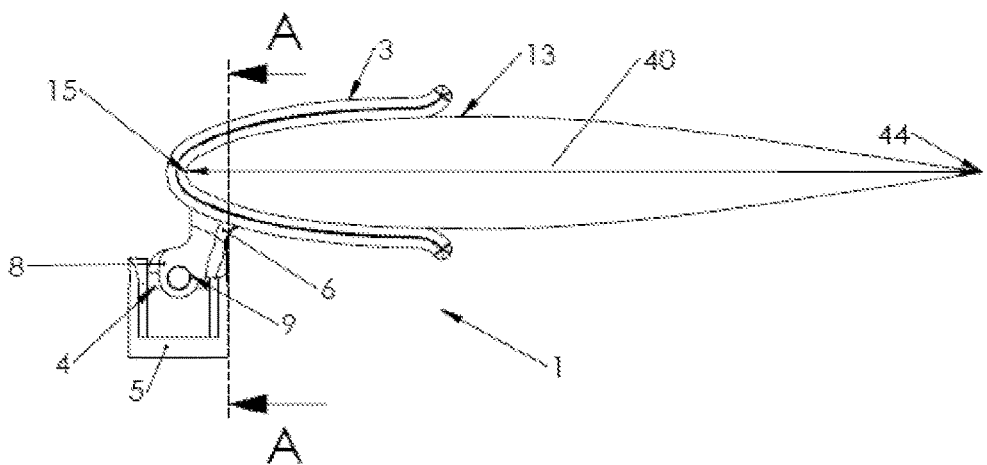
FIG. 1B is a side view of the device in FIG. 1A.
Figure 1C:
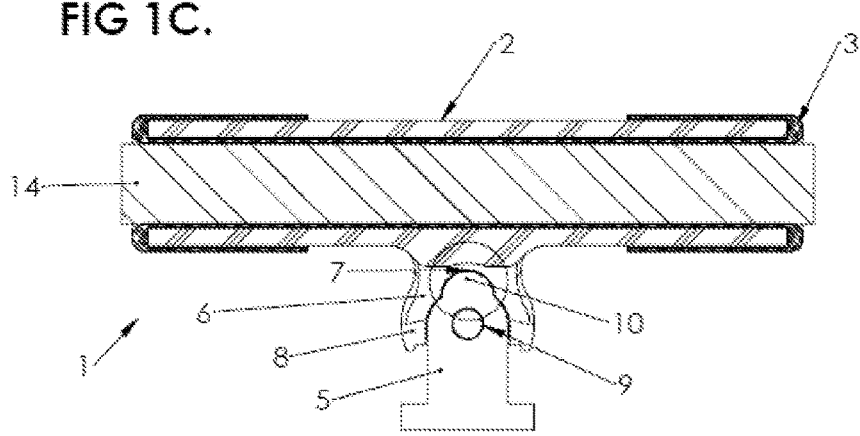
FIG. 1C is a cross sectional view taken along line A-A in FIG. 1B.

FIGS. 1A-1C show the assembled leading edge cleaning device 1 of the instant invention in contact with an airfoil shaped body 14 having a selected airfoil profile 13. The combination of the structural element 2 with the cleaning element 3 form a complementary surface to the airfoil shaped body 14 which is able to clean the leading edge 15 surface of the airfoil shaped body 14 with spanwise movement.

The delivery element 5 connection region 12 is shown in FIG. 1A and additional views in FIGS. 8A-8D. The connection region 12 attaches to an extension element 33, that may be a pole, a rod or telescopic pole, for extending the assembled cleaning device 1 to reach an airfoil shaped body 14 leading edge 15.

The side view shown in FIG. 1B offers a visualization of the initial orientation of the cleaning device 1 with respect to the airfoil profile 13 leading edge 15. FIGS. 1A and 1B show a preferred embodiment of the instant invention leading edge cleaning device 1 contacting the airfoil profile 13 NACA 63-015 of a Robinson R44 helicopter, see FIG. 9 for image and descriptive information, at a selected percentage of the chord 25 length of the airfoil shaped body 14, specifically 30%, as measured from the leading edge 15. The structural element 2 further comprises a second domain 8 containing attachment guides 37 for the intermediate member 4, shown in FIG. 3B, and attachment points 9 for intermediate member 4 pivotal shafts 45, shown in FIG. 7A. The delivery element 5 also comprises attachment guides 46 and attachment points 47, shown in FIG. 7A, for intermediate member 4 pivotal shafts 45, shown in FIG. 7A. Additional reference numbers for the trailing edge 44, and airfoil chord 40 are indicated.

FIG. 1C is a cross sectional view of the cleaning device 1 taken along line A-A in FIG. 1B and shows the cleaning element 3 attached to the structural element 2 in direct contact with the airfoil shaped body 14. Additional structures shown in FIG. 1C include structural element 2 first domain 6 comprising the female contact point 7, structural element 2 second domain 8 containing the attachment points 9, the attachment points 9 connecting to the intermediate member 4, see FIG. 1B, as well as the delivery element 5 male contact point 10.

Figure 1D:
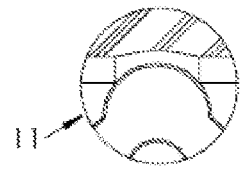
FIG. 1D is an enlarged view of the encircled area in FIG. 1C showing the mechanical stop.

FIG. 1D shows the structural element 2 that comprises a first domain 6, shown in FIGS. 1A, to comprise a female contact point 7 that forms a positive mechanical stop 11 with the male contact point 10 of the delivery element 5. The mechanical stop 11 provides forward directional alignment for controlled delivery of the LED 1 to the airfoil shaped body's 14 leading edge 15.

Figure 2:
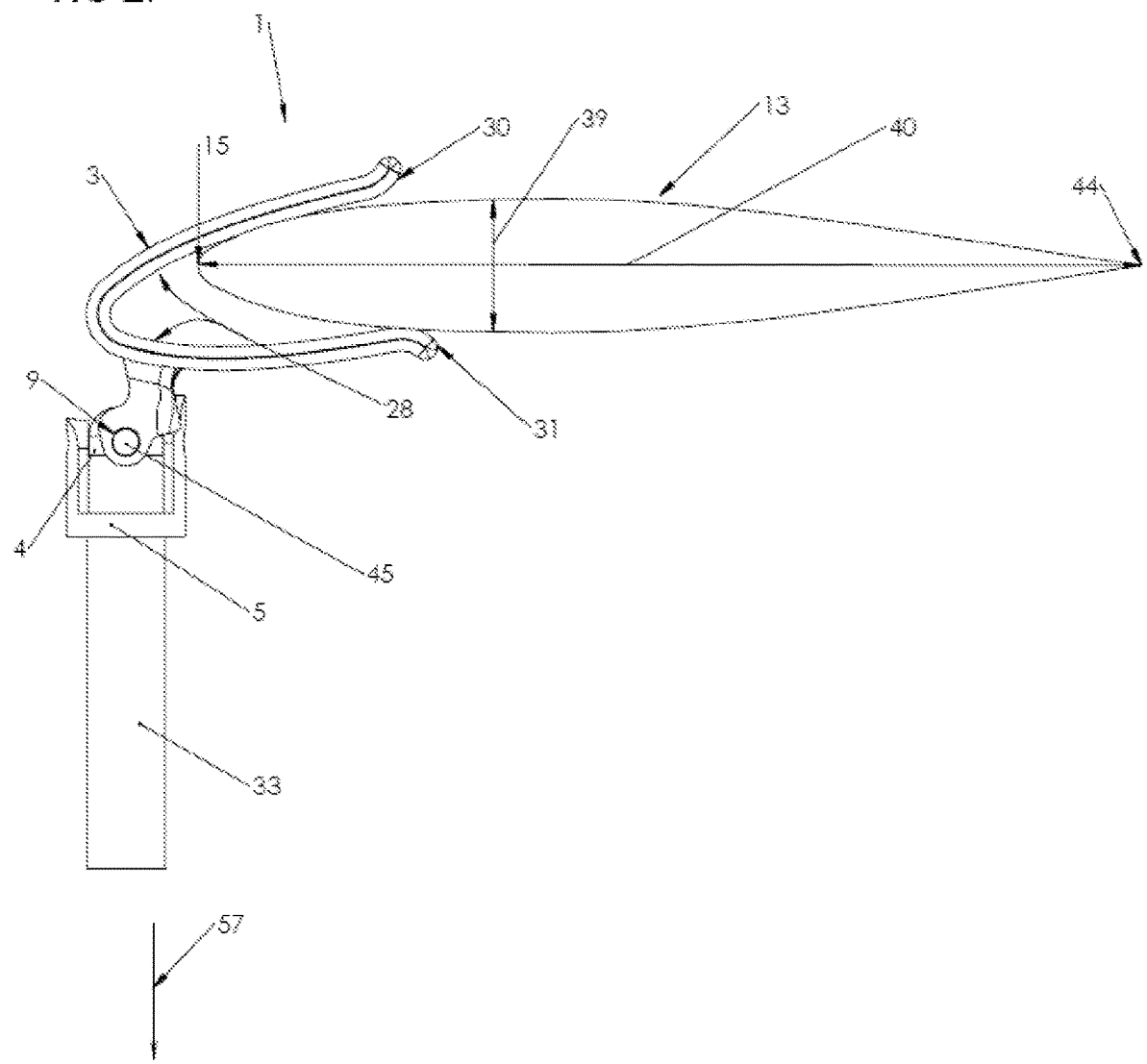
FIG. 2 is a side view of the leading edge cleaning device of FIG. 1A together with an extension element, showing the behavior of the device when downward force is applied to the extension element, causing disengagement of the cleaning device from the airfoil shaped body.

FIG. 2 shows a side view of the LED 1 of FIG. 1A together with an extension element 33, showing the behavior of the device during the application of downward force 57 to the extension element 33. The delivery element 5, being directly connected to the extension element 33, experiences an equivalent downward force 57, which is then transferred to the intermediate member 4. This causes the structural element 2 to rotate about the two concentric pivotal shafts 45 of the intermediate member 4 which are positioned along the spanwise axis; the pivotal shafts 45 attach the intermediate member 4 to the structural element 2 at the attachment points 9 contained in the second domain 8, see FIG. 1A. This rotation causes the structural element 2 and attached cleaning element 3 leading edge cleaning surface 28 to slip away from the leading edge 15 disengaging the cleaning device 1 from the airfoil shaped body 14. The upturned 30 and downturned 31 lips of the cleaning element assist the ease of disengagement of the LED 1 from the leading edge 15 by maintaining a wider opening than the thickness of the airfoil 39 at 30% of the chord 25 for the given airfoil profile 13. FIG. 2 also shows the airfoil chord 40 and the airfoil trailing edge 44.

Figure 3A:
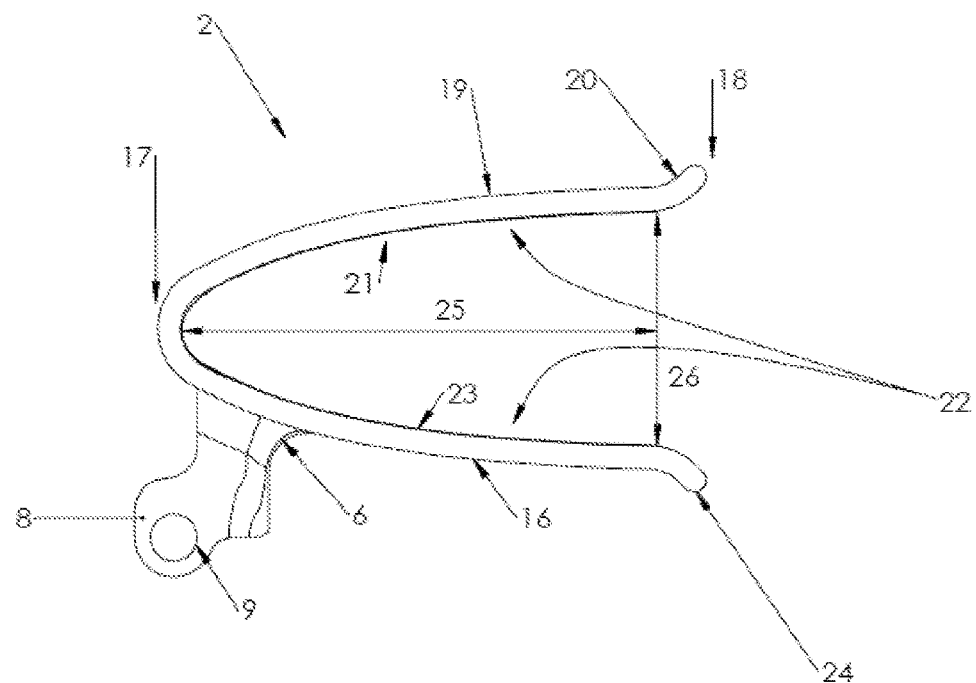
FIG. 3A is a side view of the structural element of the leading edge cleaning device of FIG. 1A.

FIG. 3A shows a preferred embodiment of the structural element 2 produced to complement a selected airfoil profile of 30% percent of the chord length 25 as measured from the leading edge 15 and a thickness at a chosen percentage of airfoil chord 26. The structural element 2 comprises an upper external surface 19, a lower external surface 16, and a concave internal surface 22, which further comprises an upper internal surface 21 and a lower internal surface 23. FIG. 3A additionally shows structural element reference numbers 17 proximal end, 18 distal end, 20 upturned lip, 24 downturned lip, first domain 6, second domain 8 and attachment point 9.

Figure 3B:
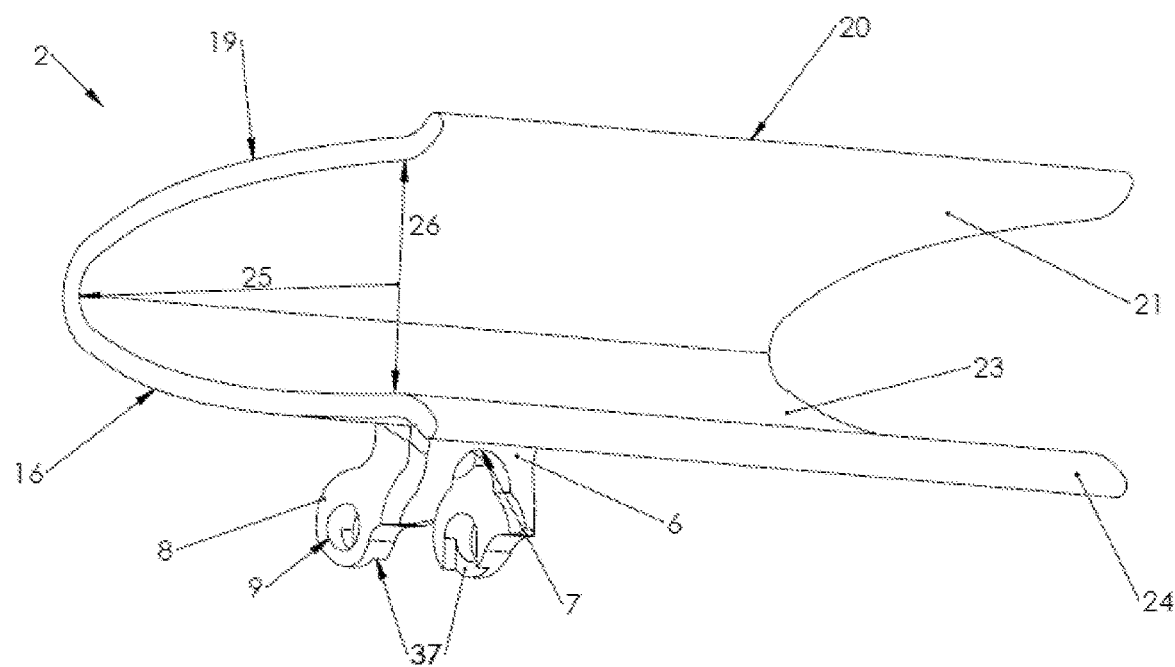
FIG. 3B is a perspective view of the structural element shown in FIG. 3A additionally showing the attachment guide for the intermediate member.

The concave internal surface 22, see FIGS. 3A and 3B, of the structural element 2 combined with the cleaning element 3, form a complementary surface which cleans the airfoil shaped body 14 over a selected percentage of the airfoil chord 25, see FIGS. 3A and 3B, specifically a percentage 25 of the airfoil chord 40 length measured from the leading edge 15.

The thickness 26 of the structural element 2, see FIGS. 3A and 3B, is likewise determined at the same percentage of the airfoil chord 40 measured from the leading edge 15 and used in forming the concave internal surface 22, which is made up of the upper internal surface 21 and the lower internal surface 23. The structural element 2, shown in FIG. 1A exemplifies a preferred embodiment of the instant invention, but the instant invention structural element 2 may be any selected percentage of 20% to 50% of the chord length 25 of an airfoil shaped body 14 as measured from the leading edge 15, such as airfoils shown in FIG. 9. The thickness of the structural element at the chosen percentage of the airfoil chord 26 forms an opening large enough to fit over the airfoil profile 13 and allows the assembled LED to engage the leading edge 15 and move spanwise over the airfoil shaped body 14 during cleaning. The thickness of the structural element at the chosen percentage of the airfoil chord 26 and is further dictated by the given airfoil shaped body 14 for which the cleaning device 2 is adapted to clean. The structural element 2 shown in FIG. 3A was configured to conform to the NACA 63-015 airfoil, shown in FIG. 9.

The upper internal surface 21 and lower internal surface 23 are bounded by an upturned lip 20 and a downturned lip 24, respectively, located at the distal end 18 of the structural element 2. The upturned 20 and downturned 24 lips help guide initial delivery of the LED to the leading edge 15 of the airfoil shaped body 14, as shown in FIGS. 1A-1C, as well as assist in securing the detachable non-abrasive cleaning element 3 to the structural element 2.

FIG. 3B shows a perspective view of the structural element 2 of the instant invention comprising the first domain 6 containing the female contact point 7, the first domain being positioned above the second domain 8 on the lower exterior surface 16 adjacent to the proximal end 17, wherein the second domain 8 comprises attachment guides 37 and attachment points 9 for reversibly combining and securely joining to the intermediate member 4. The attachment guide 37 is configured to eliminate any possible physical obstruction to the intermediate member 4, shown in FIGS. 7A and 7B, from reaching the attachment points 9 and attaching to the structural element 2.

The detachable non-abrasive absorbent cleaning element 3, as shown in FIG. 4A-D, now referred to as the cleaning element 3 of device 1, conforms to internal and external surfaces of the structural element 2 to ensure contact with the airfoil profile 13 leading edge 15.

Figure 4A:
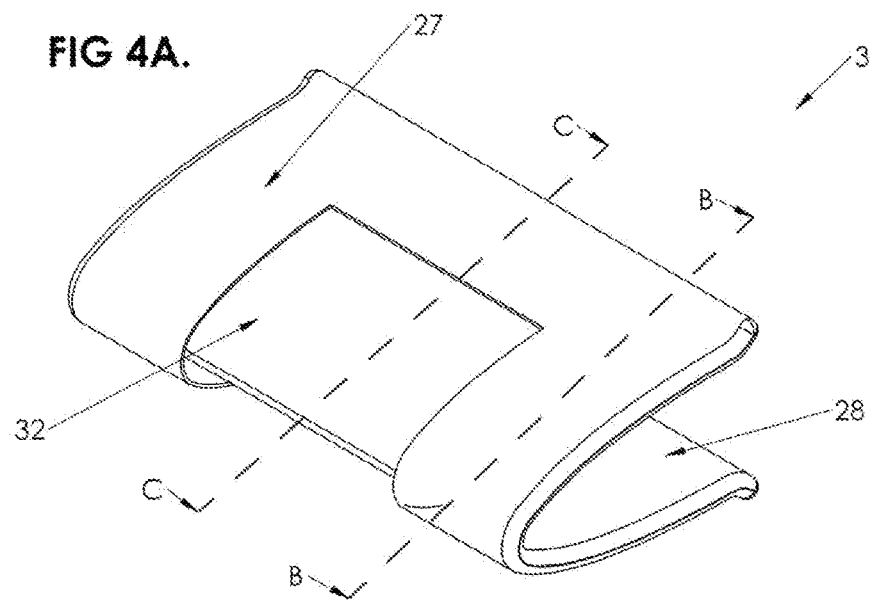
FIG. 4A is a perspective view of the detachable non-abrasive absorbent cleaning element of the leading edge cleaning device of FIG. 1A.
Figure 4B:
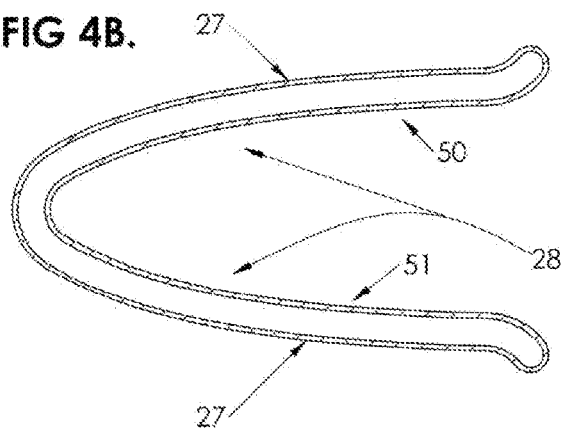
FIG. 4B is a cross sectional view taken along line B-B in FIG. 4A.
Figure 4C:
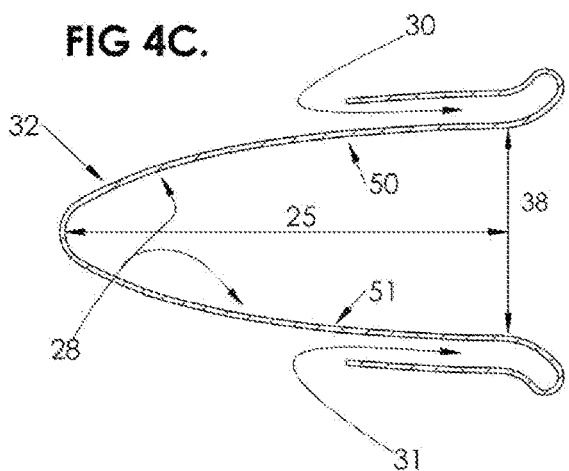
FIG. 4C is a slice cross sectional view taken along line C-C in FIG. 4A.

FIG. 4A shows the cleaning element 3 comprises an outer surface 27, a leading edge cleaning surface 28, and an interface surface with the structural element 32. Cross sections taken from FIG. 4A designated B-B and C-C are shown in FIGS. 4B and 4C, respectively, show the outer surface 27 and the leading edge cleaning surface 28, an upper lip contour 30, a lower lip contour 31, cleaning element interface surface for structural element 32 and the selected percentage of the chord length 25 complimentary to the structural element 2. The leading edge cleaning surface 28 is made up of the upper internal surface 50 and lower internal surface 51 of the cleaning element 3. The contours, surfaces, interface, and access window 29 all work together to hold the cleaning element in the desired shape, complementary to the airfoil profile 13, ensuring contact with the leading edge 15 during the cleaning process.

Figure 4D:
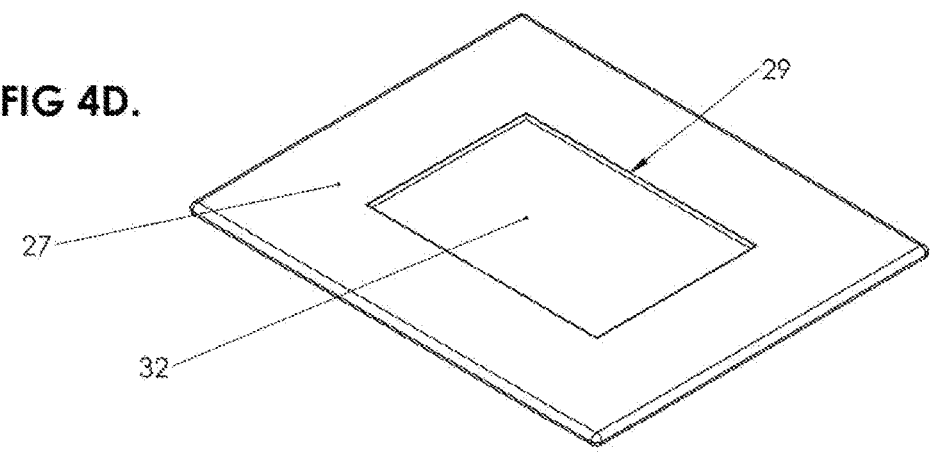
FIG. 4D is a perspective view of the detachable non-abrasive absorbent cleaning element of FIG. 4A as seen in a flat layout.

FIG. 4D shows the outer surface 27, the interface surface 32 that contacts the internal concave surface 22 of the structural element 2 and an access window 29 of the cleaning element 3. The access window 29 assists in application and removal of the cleaning element from the structural element 2.

The instant invention utilizes the thickness of the airfoil 39, shown in FIG. 2, at the same selected percentage of the airfoil chord 25, see FIG. 3A-3B, measured from the leading edge 15, see FIG. 2, to determine the thickness 26, see FIG. 3A-3B, of the distal end opening of the structural element 2, the thickness of the cleaning element 38, see FIG. 4C, as well as the leading edge cleaning surface 28, see FIGS. 4A-4D, where thickness is perpendicular to the airfoil chord 40, see FIG. 2.

Figure 5A:
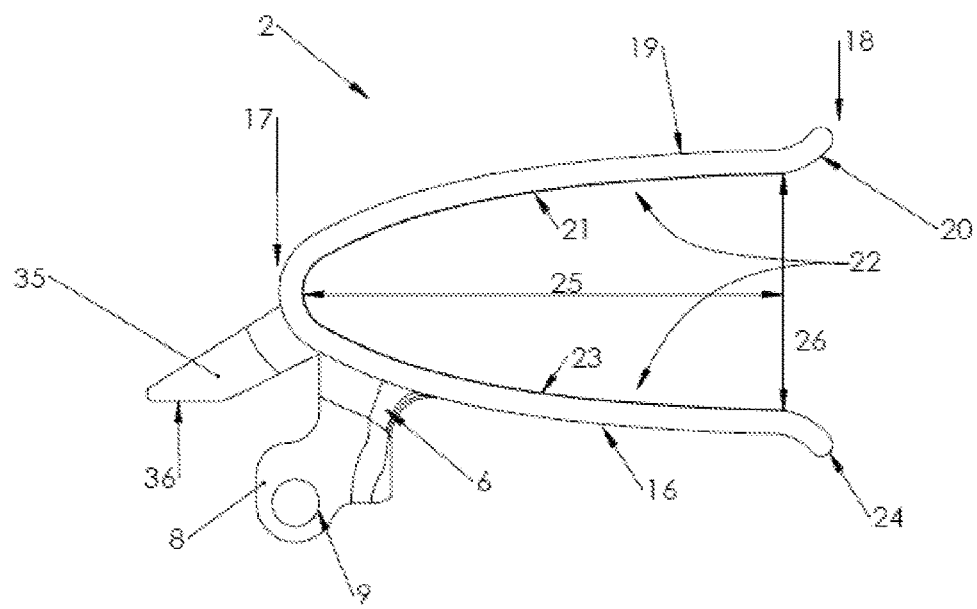
FIG. 5A is a side view of the structural element of the leading edge cleaning device of FIG. 3A further comprising a stabilizing element having a flat contacting surface.
Figure 5B:
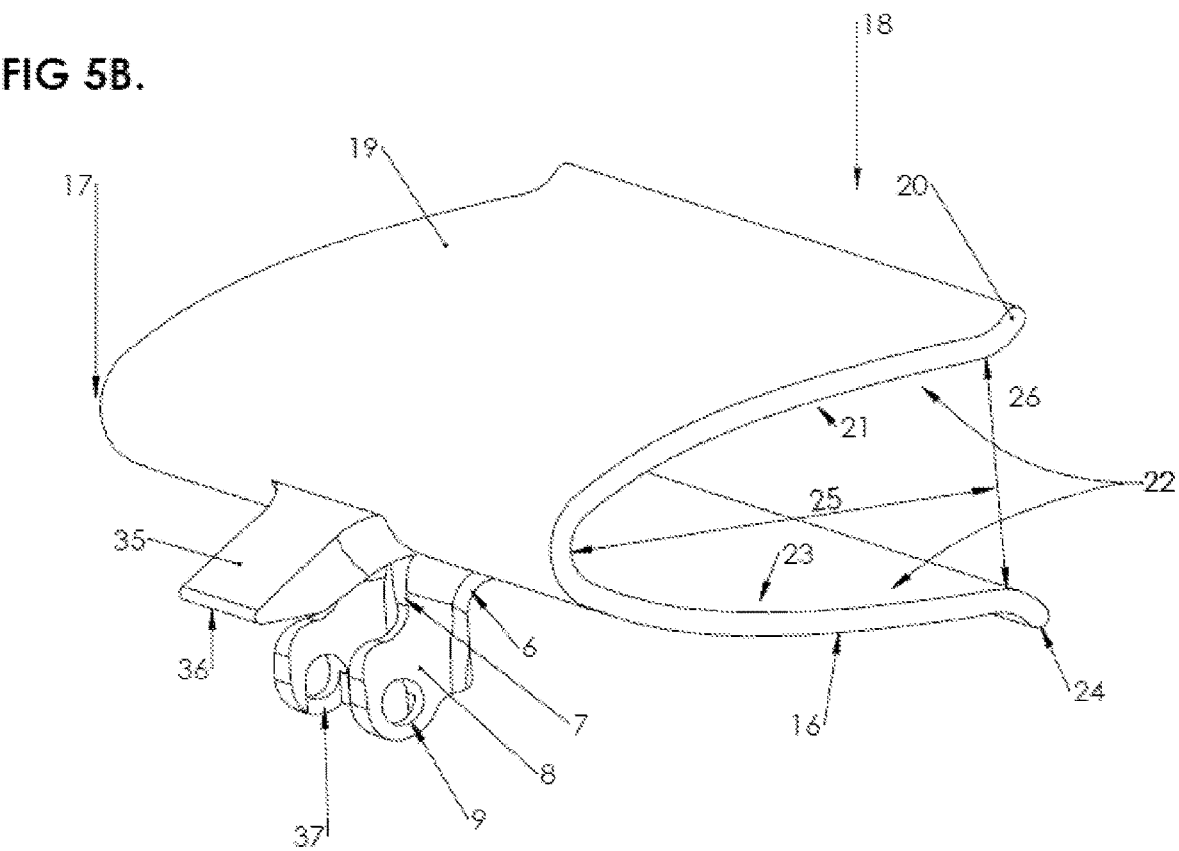
FIG. 5B is a perspective view of the structural element shown in FIG. 5A additionally showing the attachment guide for the intermediate member.

FIGS. 5A and 5B show an additional embodiment of the LED 1, the structural element 2 further comprises a stabilizing element 35, having a flat contacting surface 36 located at the proximal end 17 of the structural element 2. The flat contacting surface 36 of the stabilizing element 35 will rest against the extension element 33 for storage when not in use. The labeled parts of the structural element 2 of FIG. 5A-B are the same as those described in FIG. 3A-B with the addition of the stabilizing element 35 and flat contacting surface 36.

Assembled LED components 2, 3, 4, and 5 form a cohesive, functional cleaning device 1 useful in a method comprising the step of cleaning an airfoil shaped body 14 leading edge 15. A preferred method of cleaning comprises the steps of delivering the LED cleaning device 1 to the leading edge 15 based on mechanical stop 11 alignment of the parts 2, 3, 4, and 5, and removing surface roughness. A preferred method of cleaning an airfoil shaped body 14 leading edge profile 13 comprises the steps of applying a non-abrasive cleaning liquid or fluid 48 or non-abrasive aviation cleaning solution 48 to the cleaning device 1, delivering said device 1 to the leading edge 15 of the airfoil shaped body 14, and moving the device 1 spanwise along the leading edge 15 to remove unwanted surface contamination including particulate matter, debris, grass, pollen, insect parts, bugs, or dirt. Another preferred method comprises the steps of applying a non-abrasive cleaning liquid 48 to a leading edge cleaning device 1 that further comprises an extension element 33, stabilizing element 35 and a moveable sleeve 36; delivering the device to the leading edge 15 of an airfoil 14; and cleaning by moving spanwise along the leading edge 15 to restore a smooth surface by removing disruptions to laminar flow without causing surface abrasion, wherein said cleaning comprises the removal of surface contamination, wherein the device stabilizing element 35 displaces the movable sleeve 34 to provide a visual indication when inadvertent downward force 57 occurs.

FIGS. 6A and 6B show the instant invention further comprising a movable sleeve 34 that slides along the extension element 33 and contacts and engages with the flat contacting surface 36, see FIG. 5A-B, of the stabilizing element 35 attached at the proximal end 17 of the structural element 2, shown in combination with the cleaning element 3. The moveable sleeve 34 provides an additional structure to hold the cleaning device 1 in a forward direction when being delivered to the airfoil leading edge 15. Additionally, the stabilizing element 35 can displace the moveable sleeve 34 along the extension element 33 when inadvertent downward force 57 is applied to the cleaning device 1, causing the intermediate member 4 to rotate backwards resulting in release of the LED cleaning device 1 from the leading edge 15, exemplified in FIG. 2. Downward movement of the moveable sleeve 34 with simultaneous release of the LED 1 from the leading edge 15 can visually indicate improper use of the device, implying that inadvertent downward force 57 has been applied and the LED 1 should be repositioned to resume cleaning in a spanwise direction, to ensure an effective cleaning process.

Figure 7A:
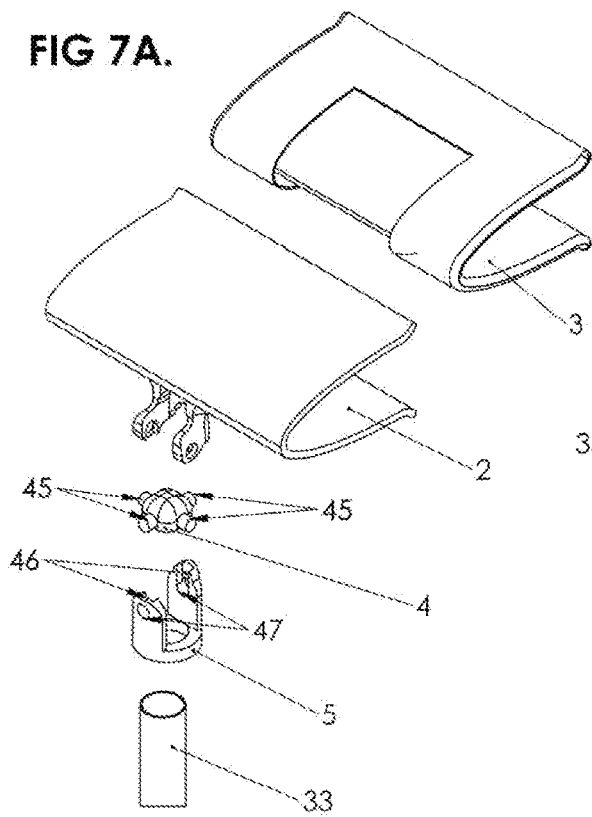
FIG. 7A is a view of the leading edge cleaning device of FIG. 2 with the individual component parts shown in the order in which they fit together.
Figure 7B:
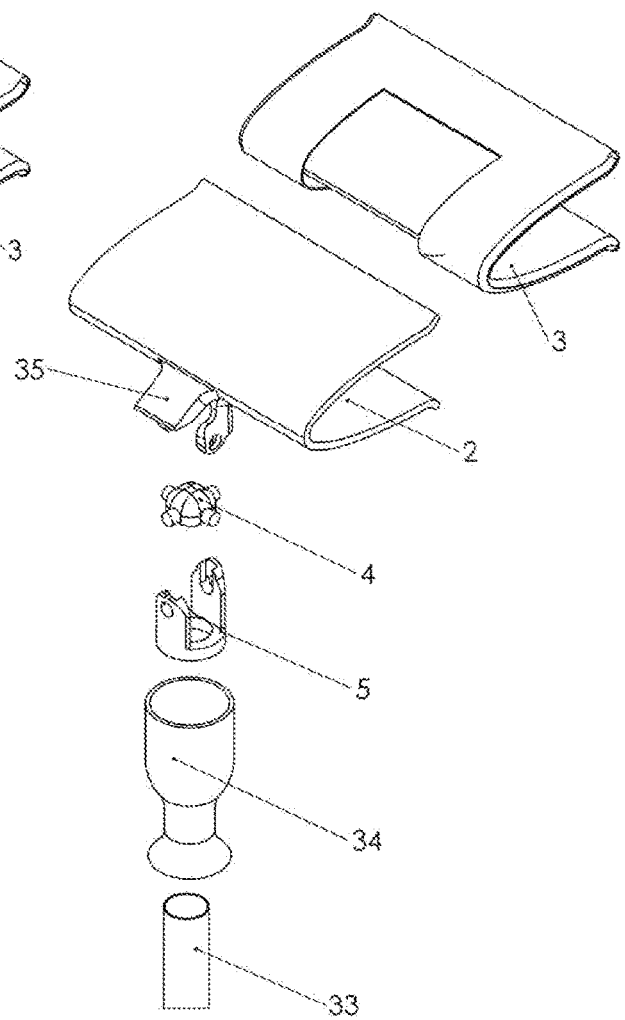
FIG. 7B is a view of the leading edge cleaning device of FIG. 6A with the individual component parts shown in the order in which they fit together.

FIGS. 7A and 7B show the LED of FIG. 2 and FIG. 6B, respectively, showing the order in which each part fits together for visualizing each LED 1 component part's shape and structure. The component parts include the structural element 2, cleaning element 3, intermediate member 4, delivery element 5, extension element 33, moveable sleeve 34 and stabilizing element 35. Intermediate member 4 comprises four pivotal shafts 45 that provide rotational capabilities about two axes for spanwise cleaning of the leading edge 15 and chordwise movement such as release from the leading edge as shown in FIG. 2 in response to inadvertent downward force 57. The intermediate member 4 pivotal shafts 45 incorporate both the delivery element 5 and the structural element 2 into the assembled LED 1. Delivery element attachment guides 46 provide the pivotal shafts 45 ready access to delivery element attachment points 47.

Figure 7C:
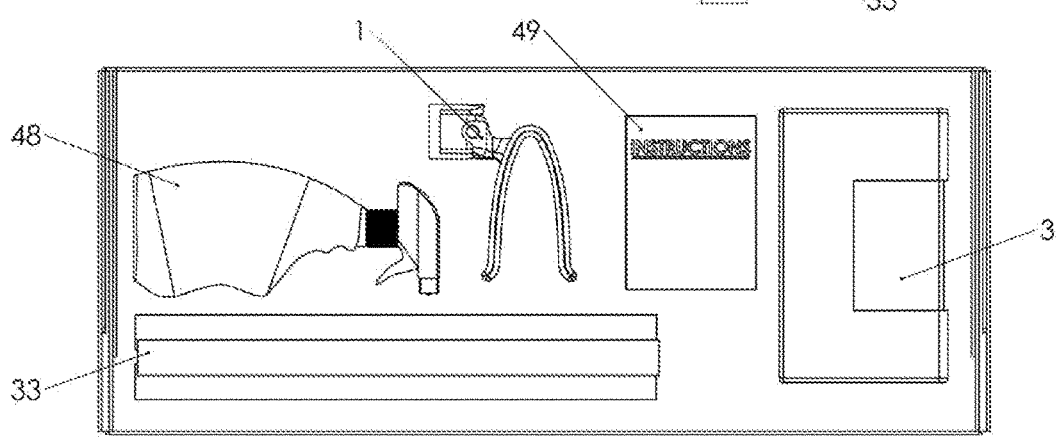
FIG. 7C is a top view of a kit comprising the leading edge cleaning device of FIG. 1B, together with a non-abrasive cleaning solution, a non-abrasive cleaning element, an extension element and instruction manual for use.

The instant invention further includes a kit shown in FIG. 7C, that comprises an assembled LED that comprises parts 2, 3, 4 and 5, together with the extension element 33, a non-abrasive, absorbent cleaning element 3, Non-abrasive cleaning liquid or fluid, or non-abrasive aviation cleaning solution 48 and instruction manual 49 for use. An alternative embodiment of kit would incorporate each of the individual component parts, shown in either FIG. 7A or 7B, into a kit and assembled when needed.

Figure 8A:
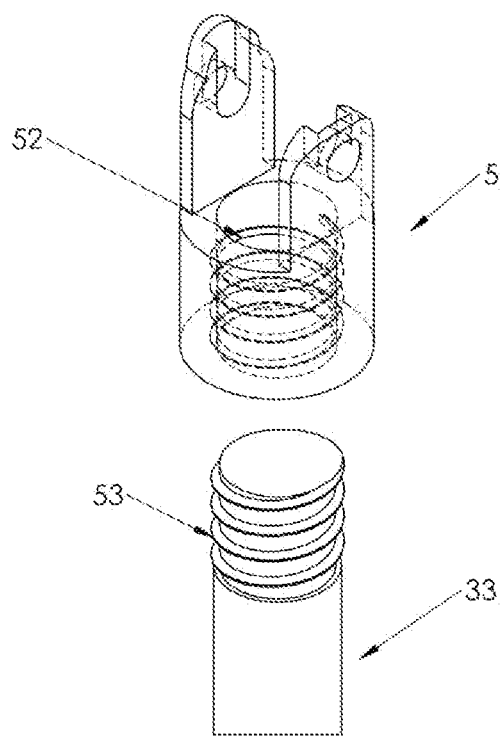
FIG. 8A is a view comprising an exemplified embodiment of the delivery element together with a threaded extension element prior to assembly.
Figure 8C:
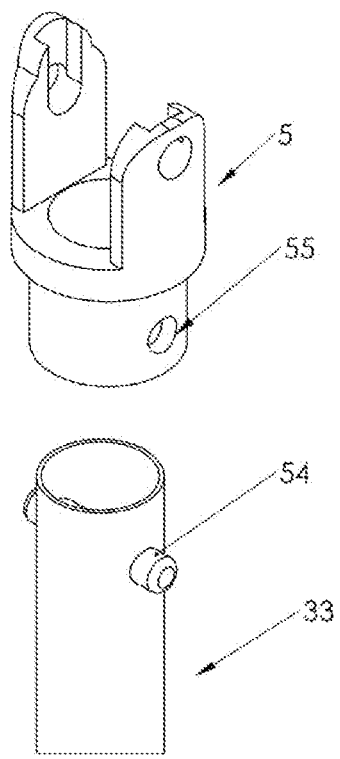
FIG. 8C is a view of an assembly comprising an exemplified embodiment of the delivery element together with an extension element having a spring-loaded pin connection prior to assembly.
Figure 8B:
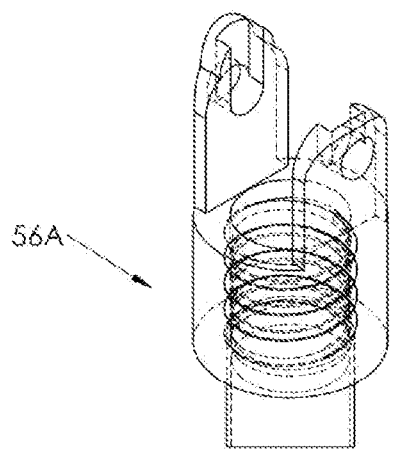
FIG. 8B is an isometric view of the assembled delivery element and extension element of FIG. 8A.
Figure 8D:
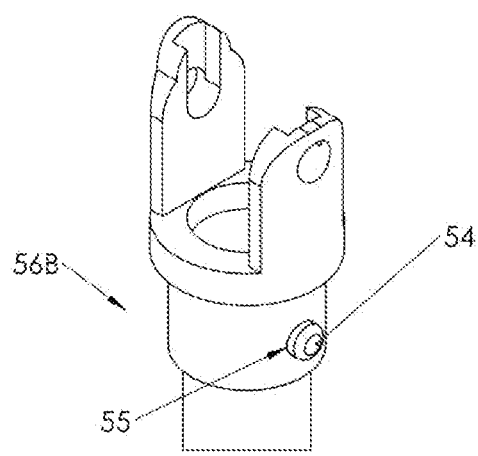
FIG. 8D is an isometric view of the assembled delivery element and extension element of FIG. 8C.

FIGS. 8A-8D show alternative embodiments of connection region 12, shown in FIG. 1A, configured for attaching the delivery element 5 to the extension element 33. FIG. 8A exemplifies a threaded delivery element 5 comprising internal threads 52, which combine to external threads 53 on the extension element 33. FIG. 8B shows the assembled threaded connection denoted as threaded delivery element assembly 56A. FIG. 8C exemplifies a delivery element 5 comprising pin connection points 55 which combine with the spring-loaded pins 54 on the extension element 33. FIG. 8D shows the assembled pin loaded connection denoted as spring loaded delivery element assembly 56B.

The chart in FIG. 9 shows both symmetrical and asymmetrical aircraft airfoil profiles for which the instant invention could be configured by one of skill in the art for cleaning the airfoil leading edge. The chart contains several abbreviations which have the following meanings: 'BAC': Boeing Aircraft Corporation; 'NACA': National Advisory Committee for Aeronautics; 'Cd. min.': Minimum drag coefficient quantifies the resistance of an object as it moves through a fluid; 'Cl., max.': maximum lift coefficient represents that point on an aircraft where all the various lifting forces act; center-of-lift maximum; 'L/D. max': is also known as minimum drag speed. It is the point on the total drag curve where the lift to drag ratio is the greatest.

FIG. 9, shows airfoil profile NACA 4415 is an asymmetrical airfoil, having a nonzero camber. As a result, the upper and lower surfaces of the airfoil are not symmetric about the chord. This would result in an LED comprising a structural element with a concave internal surface which is likewise asymmetric about the chord. The NACA 63-015 airfoil is a symmetric airfoil, having a 0.0% camber, and served as the basis for the LED embodiments shown in FIGS. 1A-7C.

FIG. 10 shows a generic airfoil profile identifying the essential components of any given airfoil. Essential components shown include: the leading edge 15, the airfoil chord 40, the mean camber line 41, the upper camber 42, the lower camber 43, and the trailing edge 44, wherein the dotted line represents the locus of the mid-points between the upper 42 and lower 43 surfaces.

DETAILED DESCRIPTION OF THE INVENTION

The instant invention will now be described by different embodiments that comprise the LED of a shape adapted to compliment a selected airfoil profile, the device can be made to be complementary to any known or future airfoil profile for the purpose of cleaning the leading edge.

The cleaning device upper and lower external surfaces of the structural element may be symmetric or asymmetric about the chord depending on the confirmation of the leading edge defined by the upper and lower cambers of a selected airfoil profile. The structural element of the LED cleaning device comprises a concave internal surface complementary to a symmetrical or asymmetrical airfoil profile of a helicopter rotor blade, windmill turbine blade, drone blade or aircraft wing.

FIG. 9 shows examples of airfoil profiles to which the instant invention could be adapted for a chosen airfoil surface to be cleaned beginning at the leading edge and extending chordwise to a selected percentage between 20% to 50% of the airfoil chord length or any percentage within the recited range. This specific percentage is to be selected by someone skilled in the art and chosen to optimize laminar flow over the percentage of the leading edge which is expected to most critically impact performance.

In a preferred embodiment the structural element of the instant invention comprises a concave internal surface which is complementary to the airfoil profile from the leading edge to 25-30% of the airfoil chord length, specifically 25%, 26%, 27%, 28%, 29% or 30% of the airfoil chord length as measured chordwise from the leading edge. The complementary shape and size of the structural element can be determined based upon the selected percentage of the length of the airfoil chord and the camber of the chosen airfoil profile. A person of skill in the art can determine the required concave internal surface complementary by simply tracing the airfoil profile or calculating the required complementarity based upon information provided in the airfoil art.

Maintaining the required complementarity is achieved by selecting a material that will maintain the required airfoil profile before and during the cleaning process. Examples of materials that can meet this requirement include polymers, plastics, 3-D printing materials, and non-abrasive plastic covered aluminum. In a preferred embodiment the material for making the structural element of the instant invention is either plastic or 3-D printing polymer. In a most preferred embodiment, the material for making the structural element is plastic that can be used in an injection molding process for the instant invention. Injection molding and 3-Dimensional (3-D) printing processes are well known in the art and can readily be used to produce the instant invention.

At the distal end of the structural element's upper and lower surfaces are upturned and down turned lips that assist in the positioning of the detachable, non-abrasive, absorbent cleaning element, also known herein as the cleaning element. The detachable non-abrasive absorbent cleaning element of the instant invention can be made from any material that is non-abrasive to the airfoil surface and is able to remove surface contamination comprising unwanted particulate matter, dirt, debris, dust, insects, bugs, pollen or grass. The cleaning element may be a microfiber cloth, non-abrasive compressed cellulose sponge or absorbent non-abrasive cloth or other absorbent non-abrasive material.

The detachable non-abrasive absorbent cleaning element conforms to internal and external surfaces of the structural element to ensure contact with the airfoil profile leading edge. The cleaning element fits onto the structural element and covers the upper, lower, and concave internal surfaces of the structural element, as well as a portion of the upper and lower external surfaces of the structural element. The cleaning element may have an access window that allows application, removal and adjustment of the cleaning element exemplified in FIG. 4 or may have two pockets that securely fit over the distal upper and lower ends of the structural element and covers the entire internal surface of the structural element, wherein the cleaning element fits the structural element in such a way that the structural element and cleaning element work together to permit secure contact with the airfoil profile leading edge and spanwise movement along the leading edge during cleaning.

FIG. 4 shows a preferred embodiment of the cleaning element that comprises an outer surface, a leading edge cleaning surface, an access window that assists in application and removal of the cleaning element from the structural element, an upper lip contour, a lower lip contour, and interface surface with the structural element; the contours, surfaces, window and interface of the cleaning element all work together to produce a desired complementary leading edge shape thus ensuring cleaning element contact with the airfoil blade leading edge during cleaning.

The combination of the structural element and cleaning element form an airfoil leading edge complementary shape that is able to contact and clean the airfoil surface over a distance from the leading edge of a selected percentage between 20% to 50% of the airfoil chord length measured from the leading edge.

The non-abrasive cleaning liquid, applied to the cleaning element in the method of the instant invention, can be water, a mild non-abrasive cleaning detergent or a known aviation non-abrasive liquid solution cleaning product. Any known leading edge cleaning liquid or solution for airfoils or blades can be used in the method of cleaning an airfoil profile leading edge with the instant invention provided they are non-abrasive and help restore a smooth airfoil surface without introducing any unwanted damage or roughness. Application of the cleaning fluid to the cleaning element can be achieved by spraying, pouring or dunking the cleaning element with the cleaning fluid. Applying the cleaning fluid can be before or after the attachment of the cleaning element to the structural element of the LED. Multiple spanwise passes along the leading edge can be used in achieving the desired clean, smooth airfoil surface. Rinsing the LED between spanwise passes has been found to remove soil and debris from the LED cleaning element that could potentially interfere in the cleaning process. Reapplication of cleaning fluid to the LED between spanwise passes has been found to help maintain a moist or wet cleaning element surface for effectively cleaning the airfoil leading edge. A single application of cleaning fluid has been found to be sufficient to clean an airfoil leading edge, as well as multiple applications of cleaning fluid with optional rinsing between cleaning fluid applications. The person of skill in the art can determine how many spanwise passes and how much cleaning fluid is required for cleaning the airfoil body based upon the amount of accumulated surface contamination located on the leading edge of the airfoil. In another embodiment, the instant invention can be used in a method of applying aviation smoothing substances such as wax, to the cleaned airfoil leading edge once all the surface contamination has been removed, by applying the wax to a second cleaning element and applying the smoothing substance to the clean leading edge with a spanwise movement.

A method of the instant invention comprises the step of cleaning the airfoil leading edge with an LED device that comprises a structural element, cleaning element, intermediate member, a delivery element and an extension element, wherein the structural element comprises the structural element shown in FIGS. 2, 5B or 6B. A preferred method for cleaning an airfoil leading edge comprises the steps of applying a non-abrasive cleaning liquid to the non-abrasive, absorbent, cleaning element; delivering an LED device that comprises a structural element, cleaning element, intermediate member, a delivery element and an extension element, wherein the structural element comprises the structural element shown in FIGS. 2, 5B or 6B, to the leading edge of said airfoil and moving the device spanwise along said leading edge to remove surface roughness due to the presence of surface contamination including unwanted particulate matter, debris, dirt, insect parts, bugs, pollen, grass, or dust.

An additional preferred method of cleaning comprises the steps of applying a non-abrasive cleaning liquid to the LED, shown in FIG. 6A or 6B, delivering the device to the leading edge of said airfoil and moving the device spanwise along the leading edge to restore a smooth surface and remove disruptions to laminar flow without causing surface abrasion, wherein said cleaning comprises the removal of surface contamination including unwanted particulate matter, soil, debris, insect parts, bugs, pollen, grass or dirt, wherein the device stabilizing element displaces the movable sleeve to provide a visual indication when inadvertent downward force occurs.

FIGS. 1A and 1B show a preferred embodiment where the structural element together with the cleaning element are in secure contact with a Robinson R44 helicopter, NACA 63-015 rotor blade. FIGS. 1A and 1B show the cleaning device was constructed to cover 30% of the airfoil chord length measured from the leading edge of the rotor blade. The leading edge cleaning device structural element upper and lower external surfaces are symmetric over the chord and the concave internal surface is complementary to the Robinson R44 rotor blade profile, the upturned and downturned lips serving to hold the detachable non-abrasive adsorbent cleaning element in place.

The structural element further comprises first and second domains. The first domain is located near the proximal end of the structural element and attached to the lower external surface. The second domain is located below and attached to the first domain.

The first domain is directly connected to the structural element's lower external surface and comprises a female contact point. The female contact point interacts with the male contact point of the delivery element to form a positive mechanical stop that helps prevent over rotation of the LED cleaning device and ensure an initial forward orientation to stably deliver the LED to the airfoil leading edge.

Below and connected to the first domain is the second domain. The second domain comprises two attachment guides and two attachment points for two intermediate member pivotal shafts. The intermediate member comprises pivotal shafts for joining to the attachment points of the second domain. The attachment guide defines a pathway for the intermediate member to reach the attachment points, where the pivotal shafts join the intermediate member to the structural element at the second domain attachment points.

The intermediate member comprises four pivotal shafts, two pivotal shafts attach the intermediate member to the structural element, and the other two pivotal shafts attach the intermediate member to the delivery element. One pair of pivotal shafts provide for chordwise delivery of the LED to the leading edge and the other pair of pivotal shafts provide for spanwise or angled rotation of the cleaning device during cleaning. Spanwise cleaning along the leading edge at an angle from the surface can be carried out based upon the pivotal shafts providing rotational flexibility about two axes. Cleaning the leading edge of the airfoil perpendicular to the airfoil leading edge is also possible. Rotation of the structural element about the chordwise axis by way of the pivotal shafts causes the distal end of the cleaning device to lift from the airfoil body and disengage from the leading edge providing assistance in removing the LED from the leading edge surface.

The delivery element comprises a male contact point that interacts with the female contact point of the structural element forming a positive mechanical stop. Forming the mechanical stop is accomplished by attaching the delivery element and the structural element to the intermediate member in a manner such that the male contact point of the delivery element contacts the female contact point of the structural element. Controlled delivery of the LED to the airfoil shaped body's leading edge is facilitated by the mechanical stop providing forward directional alignment. Once delivered to the airfoil leading edge, the LED maintains complementarity with the airfoil profile during spanwise cleaning resulting in restoration of a smooth airfoil surface. Spanwise cleaning can be in a single direction or in a back-and-forth direction for achieving a clean leading edge surface.

The delivery element connects to the extension element for ease of delivery of the LED when the leading edge of the airfoil is out of human reach. The delivery element further comprises a connection region that connects the extension element to the LED. The interaction between the delivery element and the extension element comprises a connection region that forms a secure attachment. The secure attachment may be produced by a screw thread interface, press fit, pin connection, spring loaded pin, bolted connection, clamp, a permanent interface for the extension element or adhesive. Embodiments of a screw thread interface and a pin connection are shown in FIG. 8. Any type of attachment may be used in the connection region known in the art for connecting the delivery element and extension element. Attachment of the delivery element to the extension element provides for stable delivery of the cleaning device to the airfoil profile leading edge when out of human reach.

The extension element provides for delivery of the LED cleaning device to the airfoil surface leading edge. The extension element may be hollow or solid plastic, metal, aluminum, wood, fiberglass or any other material that can be configured and attached to the delivery element connection region. The extension element may comprise a telescopic pole, a fixed length or an extendable length rod or pole. A pole is understood to include within its meaning a long, cylindrical piece of wood, metal, fiberglass or plastic. A rod is understood to include within its meaning a thin straight piece or bar of material, such as metal, wood or plastic having a particular function or use. In a preferred embodiment the extension element is made up of a series of pieces of rod or pole joined together to reach the desired length, such as a telescopic pole. When needed, the extension element will comprise a series of rod or pole lengths configured and securely attached to each other by a screw thread interface, press fit, pin connection, spring loaded pin, bolted connection, clamp, an interface adaptable to permanently connecting with the extension element through application of an adhesive or any other known way of joining poles or rods together to obtain the desired length. After the extension element securely attaches to the connection region of the delivery element the LED can be delivered to the airfoil surface leading edge.

In another preferred embodiment, the leading edge cleaning device comprises a stabilizing element attached at the proximal end of the structural element extended from the lower external surface, the stabilizing element comprising a flat contacting surface which allows the structural element to lay flat against the extension element when not in use for storage purposes.

In a further preferred embodiment the LED comprises a stabilizing element and moveable sleeve. Rotation of the LED structural element about the intermediate member pivotal shafts along the spanwise axis allows the stabilizing element to contact and push down on the movable sleeve sufficiently to remove any restricted movement the moveable sleeve could cause during spanwise cleaning of the leading edge.

In the embodiment shown in FIG. 7B, the moveable sleeve fits onto the extension element. When the moveable sleeve is pushed upwards along the extension element it initiates contact and engages with the stabilizing element, causing the flat contacting surface of the stabilizing element to rest securely on the movable sleeve when in the fully raised position, restricting unwanted rotation during initial delivery to the leading edge. The moveable sleeve provides additional directional stabilization to the structural element for initial delivery to the leading edge by engaging the stabilizing element. When the LED has been connected to a long extension element, the additional stabilization provides improved control when having to extend the LED device well overhead to reach an elevated airfoil leading edge.

Application of inadvertent downward force to the airfoil leading edge will cause the LED stabilizing element's flat contacting surface to push down on the movable sleeve allowing the device to release from the leading edge to help avoid rotor blade damage. Visual indicators of inadvertent downward force can be seen when the LED intermediate member rotates the LED away from the leading edge or the combination of the LED rotating away from the leading edge along with the LED stabilizing element displacing the moveable sleeve down the extension element. Rotation of the intermediate member resulting in the release of the LED from the leading edge points out the need to reposition the leading edge cleaning device to avoid blade damage and to ensure an effective cleaning process. A person of skill in the art would realize the importance of never pulling down on the main rotor blade of a helicopter, to include a Robinson R44 or R66 helicopter rotor blade. Downward force will cause the spindle tusk to contact and bind to an aluminum droop stop causing stress to the blade. The amplified downward force applied to the main rotor blade tip will be multiplied or amplified by the length of the blade which could affect the droop stop bolt resulting in shearing of the bolt. The information provided above was taken into consideration while designing the instant LED through incorporation of the intermediate member that helps disengage the LED from the leading edge surface in the presence of inadvertent downward force.

Even in the absence of downward force during regular use the pivotal shafts experience rotational pressure about the spanwise axis. Rotational pressure from angled spanwise cleaning of the leading edge will cause the moveable sleeve to be pushed down the extension element, disengaging from the stabilizing element, and restoring rotation about all axes.

The instant invention comprises a leading edge airfoil cleaning device for an airfoil shaped body comprising a structural element comprising a concave internal surface complementary to an airfoil profile extending chordwise to a selected percentage of the chord measured from the leading edge, wherein said concave internal surface maintains the same complementarity before and during the cleaning process, an upper external surface above the concave internal surface, a lower external surface below the concave internal surface, a first domain attached to the lower external surface comprising a female contact point, a second domain below said first domain comprising attachment guides and attachment points for an intermediate member; an intermediate member attached to both the structural element and the delivery element through pivotal shafts at said attachment points, wherein the intermediate member rotates about two axes to provide for spanwise movement of the cleaning device and will lift the cleaning device from the leading edge when the leading edge experiences inadvertent downward force; a delivery element comprising attachment guides and attachment points for the intermediate member pivotal shafts, a male contact point and a connection region for an extension element; a non-abrasive absorbent cleaning element reversibly attached to said structural element, the cleaning element serving to contact and remove airfoil profile surface roughness; wherein said leading edge airfoil cleaning device comprises a mechanical stop formed between the female and male contact points, the mechanical stop providing the initial orientation for cleaning the airfoil leading edge.

The structural element, intermediate member, and the delivery element, and optional extension element may be made of the same or dissimilar materials provided they interact together in the required ways set forth in the instant specification.

While the leading edge cleaning device can readily be used as a manual device, it also can be adapted to fit into an automated delivery machine that could use known technology to remotely control and move the instant cleaning device spanwise along the leading edge of an airfoil or blade.

The instant invention also comprises a kit for distribution of the disclosed leading edge cleaning device (LED). The LED kits comprise the structural element, as shown in FIG. 1A, or FIG. 5A, the cleaning element, the intermediate member, delivery element, and instructions for cleaning the leading edge of an airfoil shaped body. In a preferred embodiment the kits described immediately above may further comprise one or more of the extension element, a moveable sleeve, as shown in FIG. 6A, and non-abrasive cleaning liquid or solution.

The LED kit will comprise all the needed component parts to assemble the LED but may be presented in the kit in any manner desired, such as an assembled LED device without an attached extension element, see FIG. 7C; an assembled LED with an attached extension element, see FIG. 2; an assembled LED that comprises a stabilizing element, as shown in FIG. 5A or 5B, without an attached extension element;
   an assembled LED that comprises a stabilizing element, as shown in FIG. 5A or 5B, with an attached extension element; an assembled LED that comprises a stabilizing element, an extension element, and a moveable sleeve, see FIG. 6B; or individual compartments for each component part of the LED device for later assembly; individual parts are shown in FIG. 7A or 7B or the structural element of FIG. 5A or 5B used in the assembled LED.

FIG. 7C shows a preferred embodiment of a compiled kit which includes the assembled LED of FIG. 1B, an extension element, a cleaning element with an access window, a container of non-abrasive cleaning liquid and instruction manual for cleaning the leading edge of an airfoil shaped body. The extension element shown in FIG. 7C comes in segments that will fit together to a desired length so the LED can be extended to reach to the airfoil leading edge surface to carry out the cleaning process.

Another embodiment of the kit comprises the LED cleaning device of FIG. 1A, or FIG. 2, together with non-abrasive cleaning liquid and instruction manual for cleaning the leading edge of an airfoil shaped body.

Still another preferred embodiment of the kit comprises the LED cleaning device of FIG. 6A together with a non-abrasive cleaning liquid and instruction manual for cleaning the leading edge of an airfoil shaped body.

Example 1: The leading edge cleaning device of the instant invention was configured to clean the leading edge of a Robinson R44 helicopter rotor blade. The LED cleaning device was produced to contact and clean the airfoil rotor blade over 30% of the airfoil chord as measured from the leading edge. Under the same flight conditions, manifold pressure was chosen to show LED effectiveness in cleaning surface contaminated helicopter rotor blades relative to cleaned rotor blades, the cleaned rotor blades providing for improved helicopter performance. Over numerous flights in a Robinson R44 helicopter, the pilot repeatedly observed a consistent drop in the manifold pressure required to drive the blades at 100% RPM after surface contamination was removed from the leading edge over 30% of the airfoil chord as measured from the leading edge using the instant LED. The Robinson R44 helicopter evidenced a consistent drop on the manifold pressure gauge equivalent to 1 inHg, and at times as great at 1.5 inHg after surface contaminated rotor blades were cleaned with the instant LED. The lower manifold pressure points to increased engine efficiency, indicating lower power is required to generate equivalent torque to drive the rotor blades. A manifold pressure drop of 1 inch mercury (abbreviation: "inHg") was observed by the pilot to be equivalent to lifting 100 pounds more weight or to climb out of a confined space at a steeper angle; less power is required to do the same amount of work.

Example 2: An LED complementary to the airfoil profile of a Robinson R66 helicopter (now referred to as R66) rotor blade was used to clean the rotor blade leading edge surfaces over 28% of the airfoil chord as measured from the leading edge. Torque values produced with surface contaminated rotor blades and LED cleaned rotor blades were measured for the R66 flown under the same flight conditions during a two foot hover. It was observed that removal of surface contamination from the R66 rotor blade leading edges showed a 2% decrease in torque value. A decrease of 2% torque enabled lifting an additional 75 pounds of weight during the two foot hover. Cleaning the leading edge of the rotor blades over 28% of the airfoil chord as measured from the leading edge provided for improved R66 helicopter performance.

The instant invention has been described in at least one exemplary embodiment of the invention and it should be understood that modifications, substitutions and alternatives may be apparent to one of ordinary skill in the art and can be made without departing from the central concept within the scope of the disclosure and claims. The instant disclosure encompasses features of the embodiments described above and may be combined with each other.

The patentable scope is defined by the claims and may include other examples that occur to those skilled in the art to include modifications, substitutions and alternatives and can be made without departing from the scope of the disclosure. Such other examples are intended to be within the scope of the claims and do not differ from the literal language of the claims or if they include equivalent structural elements with insubstantial differences from the literal languages of the claims. The terms "comprise" or "comprises" or "comprising" do not exclude other elements or steps, and the terms "a," "an" or "one" do not exclude a plural number, and the term "or" means either or both. When a claimed method recites more than one method step, the method steps may be carried out concurrently or alternatingly where appropriate. Various elements or structures, as well as steps which have been described may be used in combination with other elements, structures and steps in any order unless the disclosure or context suggests otherwise.

What is claimed:

1. A leading edge cleaning device for an airfoil shaped body comprising:
   a structural element comprising:
      a concave internal surface complementary to an airfoil profile extending chordwise to a selected percentage of the chord measured from the leading edge, wherein said concave internal surface maintains the same complementarity before and during the cleaning process; an upper external surface above the concave internal surface; a lower external surface below the concave internal surface; a first domain attached to the lower external surface comprising a female contact point; a second domain below said first domain comprising attachment guides and attachment points for an intermediate member;
   a delivery element comprising attachment guides and attachment points for an intermediate member pivotal shafts, a male contact point and a connection region configured for attaching an extension element;
   an intermediate member attached to both the structural element and the delivery element through pivotal shafts at said attachment points, wherein the intermediate member rotates about two axes to provide for spanwise movement of the cleaning device during cleaning, and will lift the cleaning device from the leading edge when the leading edge experiences inadvertent downward force;
      a non-abrasive absorbent cleaning element reversibly attached to said structural element, the cleaning element serving to contact and remove airfoil profile surface roughness;
   wherein said leading edge airfoil cleaning device comprises a mechanical stop formed between the female and male contact points, the mechanical stop providing the initial orientation for cleaning the airfoil leading edge.

2. The leading edge cleaning device of claim 1, wherein the concave internal surface complementary to an airfoil profile of a selected percentage of the chord measured from the leading edge extends 30% chordwise measured from the leading edge.

3. The leading edge cleaning device of claim 1, wherein the structural element comprises a concave internal surface complementary to a symmetrical or asymmetrical airfoil profile.

4. The leading edge cleaning device of claim 3, wherein the structural element comprises a concave internal surface complementary to a symmetrical airfoil profile.

5. The leading edge cleaning device of claim 1, wherein said structural element comprises a concave internal surface complementary to an airfoil profile of a helicopter rotor blade or aircraft wing.

6. The leading edge cleaning device of claim 1, wherein the structural element comprises plastic, polymer, or non-abrasive plastic-coated aluminum.

7. The leading edge cleaning device of claim 6, wherein the structural element comprises plastic or polymer used in 3-Dimensional printing or injection molding.

8. The leading edge cleaning device of claim 1, wherein the structural element further comprises an upturned lip and a downturned lip at the distal end.

9. The leading edge cleaning device of claim 1, wherein the non-abrasive absorbent cleaning element comprises microfiber fabric, or compressed cellulose sponge.

10. The leading edge cleaning device of claim 1, wherein the connection region configured for attaching an extension element comprises a screw thread interface, press fit, pin connection, spring loaded pin, bolted connection or clamp for an extension element.

11. The leading edge cleaning device of claim 1, further comprising an extension element attached to the delivery element.

12. The leading edge cleaning device of claim 11, wherein said extension element comprises a telescopic pole.

13. The leading edge cleaning device of claim 11, further comprising a stabilizing element extending from the lower external surface at the proximal end of the structural element, the stabilizing element comprising a flat contacting surface.

14. The leading edge cleaning device of claim 13, further comprises a movable sleeve engaging said stabilizing element, wherein the moveable sleeve provides additional directional stabilization to the structural element for initial delivery to the leading edge, and can further provide a visual indication of inadvertent downward force when the moveable sleeve experiences downward movement combined with simultaneous release of the cleaning device from the leading edge, the visual indication pointing out the need to reposition the leading edge cleaning device to avoid blade damage and ensure an effective cleaning process.

15. A method for cleaning an airfoil leading edge comprising the step of
   cleaning said airfoil leading edge with the device of claim 11.

16. The method of claim 15, wherein the said cleaning comprises the steps of applying a non-abrasive cleaning liquid to the non-abrasive absorbent cleaning element;
   delivering the device to the leading edge of said airfoil; and
   moving the device spanwise along said leading edge to remove surface contamination comprising unwanted particulate matter, debris, dirt, insect parts, bugs, pollen, grass or dust.

17. A method of cleaning the airfoil leading edge comprising the steps of
   applying a non-abrasive cleaning liquid to the cleaning device of claim 14;
   delivering the device to the leading edge of said airfoil; and
   cleaning by moving the device spanwise along the leading edge to restore a smooth surface and remove disruptions to laminar flow without causing surface abrasion, wherein said cleaning comprises the removal of surface contamination comprising unwanted particulate matter, debris, insect parts, bugs, dust, pollen, grass or dirt, wherein the device stabilizing element displaces the movable sleeve to provide a visual indication when inadvertent downward force occurs.

18. A cleaning kit comprising the cleaning device of claim 1, together with non-abrasive cleaning liquid and instructions for cleaning the leading edge of an airfoil shaped body.

19. A cleaning kit comprising the cleaning device of claim 11, together with non-abrasive cleaning liquid and instructions for cleaning the leading edge of an airfoil shaped body.

20. A cleaning kit comprising the cleaning device of claim 14, together with non-abrasive cleaning liquid and instructions for cleaning the leading edge of an airfoil shaped body.

\* \* \* \* \*